United States Patent [19]
Ito et al.

[11] Patent Number: 5,476,618
[45] Date of Patent: Dec. 19, 1995

[54] METHOD OF FORMING A RESIN LAMINATE CONTAINING FOAM BEADS

[75] Inventors: Keizou Ito; Takashi Kato; Syoji Sakaida; Hikaru Ando, all of Inazawa, Japan

[73] Assignee: Toyoda Gosei Co., Ltd., Japan

[21] Appl. No.: 104,596

[22] Filed: Aug. 10, 1993

[30] Foreign Application Priority Data

Aug. 11, 1992 [JP] Japan ................................ 4-236577
Jan. 13, 1993 [JP] Japan ................................ 5-022142

[51] Int. Cl.$^6$ ........................... B29C 44/06; B29C 44/12
[52] U.S. Cl. ................ 264/45.4; 264/46.4; 264/46.5; 264/46.8; 264/45.9; 264/273; 264/321; 264/511; 264/126
[58] Field of Search ...................... 264/321, 46.4, 264/45.9, 45.4, 46.8, 511, 126, 273, 46.5, 46.6, 171; 156/196, 245

[56] References Cited

U.S. PATENT DOCUMENTS

| | | |
|---|---|---|
| 4,036,675 | 7/1977 | Amberg et al. . |
| 4,128,683 | 12/1978 | Nomura et al. ........................ 156/322 |
| 4,519,964 | 5/1985 | Rosen . |
| 4,663,210 | 5/1987 | Schreiber et al. ...................... 264/321 |
| 4,740,417 | 4/1988 | Tornero .................................. 264/321 |
| 4,968,474 | 11/1990 | Ito ........................................... 264/321 |
| 5,149,478 | 9/1992 | Malm ...................................... 156/196 |
| 5,196,151 | 3/1993 | Sakaida et al. ......................... 264/321 |

FOREIGN PATENT DOCUMENTS

| | | |
|---|---|---|
| 0024740 | 3/1981 | European Pat. Off. . |
| 0477476 | 4/1992 | European Pat. Off. . |
| 2401034 | 7/1975 | Germany . |
| 3842846 | 6/1990 | Germany . |
| 55-73533 | 6/1980 | Japan . |
| 58-171921 | 10/1983 | Japan . |
| 63-56436 | 3/1988 | Japan . |

OTHER PUBLICATIONS

Patent Abstracts of Japan, vol. 6, No. 43 (M–117) (921) Mar. 1982 re: JP-A-157329.
Patent Abstracts of Japan, vol. 009087, Dec. 1984 re: JP-A-59-215835.
Patent Abstracts of Japan, vol. 7, No. 110 (M–214) May 1983 re: JP-A-58029633.

*Primary Examiner*—Allan R. Kuhns
*Attorney, Agent, or Firm*—Cushman Darby & Cushman

[57] ABSTRACT

A resin laminate of the invention includes a sheet laminate including a skin, which is securely joined with a foamed bead base by heating. The resin laminate is manufactured according to the following steps. The foamed bead base and the sheet laminate consisting of the skin, a foam layer, and a thermoplastic resin film are prepared separately. The thermoplastic resin film is made of a resin material which thermally adheres to both the foam layer and the foamed bead base and has a softening temperature lower than those of the foam layer and the foamed bead base. The thermoplastic resin film is softened by heating the sheet laminate, which is then softened by heating the sheet laminate, which is then pressed against and bonded to the foamed bead base by vacuum molding or press forming. The thermoplastic resin film thermally adheres to both the foam .layer of the sheet laminate and the foamed bead base, thus joining the sheet laminate with the foamed bead base.

11 Claims, 11 Drawing Sheets

METHOD OF FORMING A RESIN LAMINATE CONTAINING FOAM BEADS

The priority applications Nos. 4-236577 and 5-22142, filed in Japan Aug. 11, 1992 and Jan. 13, 1993, respectively, are hereby incorporated by reference.

BACKGROUND OF THE INVENTION

1. Field of the Invention

The present invention relates to a resin laminate including a solid resin member and a foamed resin layer; and to a method of manufacturing same.

2. Description of the Art

FIG. 1 is a cross sectional view of a conventional resin laminate. A resin laminate is manufactured by applying an adhesive 220 onto either a skin 212 including a foam layer 211 or a foamed bead base 218 and securely adhering the skin 212 to the foamed bead base 218 by vacuum molding or press forming.

The application of the adhesive is time- consuming and uniform application of the adhesive is difficult. Uneven application of the adhesive 220 often causes irregularities or roughness on the surface of the skin 212 which may damage the ornamental capacity of the skin, as is demonstrated in FIG. 1. The irregularities on the surface of the foamed bead base 218 also cause roughness of the skin 212.

In another known method of manufacturing a resin laminate, a skin and a foamed bead base are each made of the same material, for example, polypropylene, and they are thermally adhered to each other during the process of vacuum forming. This method does not however, eliminate adverse effects of the roughness of the foamed bead base on the skin surface. Furthermore this method provides a relatively low adhering strength, especially on both ends of the foamed bead base where the temperature during the adhering process is relatively low. If the temperature is increased, however, the skin and the foamed bead base may be deformed.

Another technique to manufacture a resin laminate including a foam layer and a skin is disclosed in JAPANESE PATENT LAID-OPEN GAZETTE No. Sho-58-171921. This method includes the steps of vacuum forming a skin of a desirable shape, placing the skin in a mold of a forming device, piling resin foamed beads, which are preliminary expanded, upon the inner face of the skin in the mold and thermally expanding the resin foaming beads with steam to mold a reinforcing foam layer under the skin. Since the resin foaming beads generally have irregularities on their surface, it is impossible to produce a thin skin which will hide the irregularities and, as a result, the ornamental capacity of the skin is decreased. A thicker skin is therefore required to compensate for the irregularities of the resin forming beads, but the thicker skin increases the manufacturing cost.

Moreover, the resin foaming beads are only expanded over a narrow range of temperature. Even if the temperature of steam, the normal method of expansion, is slightly out of the suitable temperature range, the resin foaming beads may be insufficiently expanded or excessively molten such that they are deformed and hence, unacceptable. On the other hand, the skin is required to be partly molten on the surface such that it can be adhered to the foam layer. Even if the temperature range suitable for melting the skin is slightly different from the temperature range suitable for expanding the resin beads, the skin may be insufficiently molten or excessively molten, causing deformation. The materials which can be used for the skin are therefore limited to a very narrow range.

Conventionally, a resin laminate for automobile components includes a skin, a foam layer, and a resin base. In expanding the foam layer, a surface of the resin base as well as that of the skin are melted to adhere to the foam layer. The resin base, which is directly attached to the body of a vehicle, is required to have a sufficient strength. If the resin base is made of an olefin resin, such as polypropylene, the resin material should have a high glass transition point to assure the sufficient strength. If such a resin material having a high glass transition point is used for the resin base, however, there are no suitable resin foaming beads which have an expanding temperature close enough to the glass transition point to be acceptable in conjunction with such a resin.

SUMMARY OF THE INVENTION

The present invention provides a resin laminate which includes a solid resin member and a foamed resin layer securely adhered to each other. A method of manufacturing the laminate is also provided. Further, an improved resin laminate is provided wherein the influence of any irregularities of the foamed bead base on the skin of the laminate are reduced.

A resin laminate is provided wherein the resin member is adhered to a foam layer by expansion of foam resin beads.

The present invention is further directed to a resin laminate having a resin member substantially consisting of a first resin material, the resin member having a first surface and a second surface; a foam layer made of the first resin material, the foam layer being disposed opposite to the second surface of the resin member; and a thermoplastic resin sheet made of a second resin material, which is any of a group meltable to the first resin material; such that the second resin material has a lower glass transition point than the first resin material. The thermoplastic resin sheet being disposed between the resin member and the foam layer, such that the thermoplastic resin sheet adhering to the resin member and the foam layer by being melted and re-solidified.

According to one embodiment of the present invention, the glass transition point of the thermoplastic resin sheet is from 5 to 60 degrees centigrade lower than that of the resin member and the foam layer.

According to another embodiment of the present invention, the foam layer is prepared in advance by thermally expanding a plurality of resin foaming beads.

According to a further embodiment, the foam layer is adhered to the thermoplastic resin sheet while thermally expanding a plurality of resin foaming beads to form the foam layer.

According to another embodiment, the resin member is a skin having at least one surface provided with an ornamental design. The resin member may further comprises a foam sheet laid over the skin.

According to another embodiment, the resin member is a solid resin base. In yet another embodiment, the resin member comprises a skin having an ornamental surface and solid base, and the foam layer is disposed between the skin and the solid base. In still another embodiment, the resin member, the foam layer, and the thermoplastic resin sheet are made of olefin resin. The olefin resin may be polypropylene, and the resin laminate may be an interior member for automobiles.

The present invention further provides a method of manufacturing a resin laminate comprising the steps of:

preparing a resin member substantially consisting of a first resin material, a foamed bead base substantially consisting of the first resin material, and a thermoplastic resin sheet made of a second resin material, which is in the group meltable to the first resin material, the thermoplastic resin sheet having a glass transition point lower than those of the resin member and the foam bead base;

heating the resin member, the thermoplastic resin sheet and the foam bead base, and piling the resin member, the thermoplastic resin sheet, and the foamed bead base one upon another, and applying a pressure between the resin member and the foamed bead base, thereby thermally adhering the resin member to the foamed bead base through the thermoplastic resin sheet.

The preparation step may include a thermoplastic resin sheet made of an olefin resin with a glass transition point with range of 5° to 60° C. lower than those of the resin member and the foamed bead base. Further, the resin member may be thermally adhered to the thermoplastic resin sheet. The preparing step may further involve forming a laminate of the resin member and the thermoplastic by simultaneously extruding the first resin material and the second resin material.

The process of adhering may further include, drawing the resin member and the thermoplastic resin sheet onto a face of the foamed bead base placed on a vacuum forming device by suction, to thermally adhere the resin member and thermoplastic resin sheet conforming to the face of the foamed bead base.

Placing the foam bead base on a forming device may further include placing the foamed bead base on a male mold; and placing the resin member and the thermoplastic resin sheet between a female mold and the foamed bead base; where adhering further comprises the steps of closing the male mold and the female mold; and, drawing the resin member and the thermoplastic resin sheet onto a molding face of the female mold by suction, to shape the resin member and thermoplastic resin conforming to the molding face. Thereby, thermally adhering the thermoplastic resin sheet to the formed beads base.

The present invention is also directed to a method of manufacturing a resin laminate, wherein a resin member is prepared from a first resin material, resin foaming beads of the first resin material, and a thermoplastic resin sheet of a second resin material, which is chosen to be meltable to the first resin material; the thermoplastic resin sheet having a glass transition point lower than that of the resin member. The resin member and the thermoplastic resin sheet are placed in a mold while maintaining a predetermined space facing the thermoplastic resin sheet. The resin foaming beads are supplied into the space; and the resin foaming beads are heated to form a foam layer. The foam layer being thermally adhered to the resin member via the thermoplastic resin sheet through melting by heating and re-solidifying of the thermoplastic resin sheet member.

The thermoplastic resin sheet preferably has a 5° to 60° C. lower glass transition point than those of the resin member or the foam layer.

According to still another embodiment of the present invention, the resin member comprises a skin and a solid base, with the solid resin base positioned opposite to the thermoplastic film across the space.

The method according to the present invention may further provide for drawing the skin onto a molding face of a mold by suction, to thereby shape the skin conforming to the molding face.

The above and other related objects and embodiments are at least partly realized by a method of manufacturing a resin laminate including a resin member and a foam layer, which includes the following steps.

After a resin member and a foam layer are prepared, a thermoplastic resin sheet is placed between the resin member and the foam layer. The thermoplastic resin sheet may be a film or a foam sheet made of a resin material which thermally adheres to both the resin member and the foam layer and has a glass transition point lower than those of the resin member and the foam layer. The resin member, the thermoplastic resin sheet, and the foam layer are then joined together by press forming or vacuum molding. Since the thermoplastic resin sheet thermally adheres both to the resin member and the foam layer, the resin member is securely joined with the foam layer.

The resin laminate of the invention may be manufactured according to an alternate process in which a resin member, including a skin and a base, a number of resin foaming beads, and a thermoplastic resin sheet are prepared separately. While the resin member and the resin foaming beads are made of a first resin material, the thermoplastic resin sheet is made of a second resin material which is in the group meltable to the first resin material, which has a glass transition point lower than that of the first resin material.

The resin member and the thermoplastic resin sheet are, in this embodiment, placed in the cavity of the mold such that there is a sufficient space on the side of the thermoplastic resin sheet opposite the resin member. The resin foaming beads are then supplied into the space of the cavity and expanded with heat, such as steam, to form a foam layer. The foam layer is thus adhered to the resin member via the thermoplastic resin sheet melted by heat.

The thermoplastic resin sheet preferably has a glass transition point lower than those of the resin member and the foam layer, thus becoming adhesive at a relatively low temperature which does not cause undesirable deformation of the final resin member.

The process of the invention using the thermoplastic resin sheet does not require application of an adhesive as used in conventional processes. Thus, the present invention provides for simplified manufacturing process, making the skin free from undesirable roughness due to uneven application of conventional adhesives.

The thermoplastic resin sheet is thought to effectively cover irregularities or roughness on the surface of the foam layer, thus making the skin free from unacceptable irregularities and improving the appearance of the resin laminate.

These and other objects, features, aspects, and advantages of the present invention will become apparent from the following detailed description of the preferred embodiment as well as from the accompanying drawings.

DETAILED DESCRIPTION OF THE INVENTION

Figure 1:
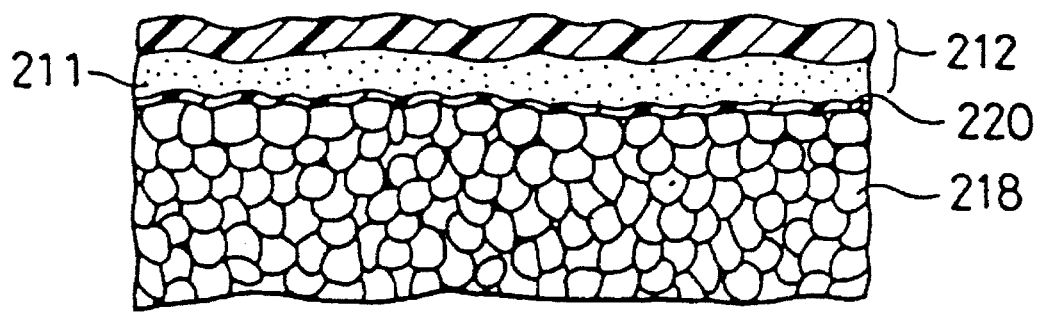
FIG. 1 is a cross sectional view showing a resin laminate of the prior art.
Figure 2:
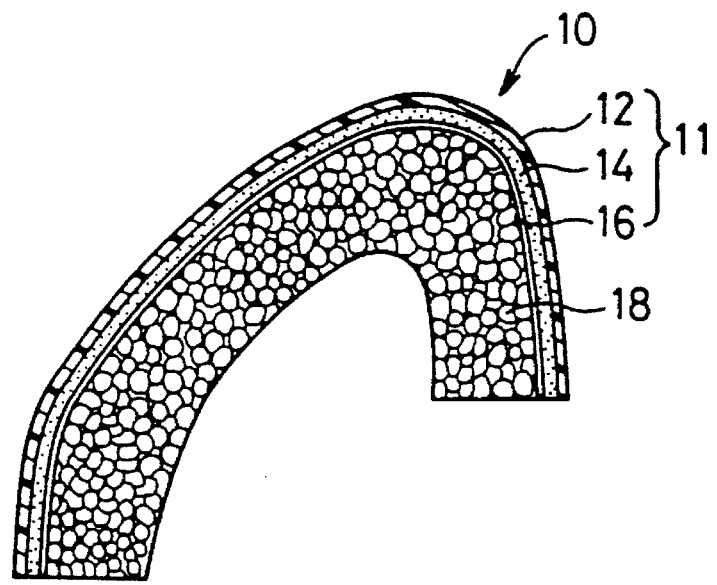
FIG. 2 is a cross sectional view showing an interior member for automobiles according to the invention.

FIG. 2 is a cross sectional view illustrating an interior member for an automobile manufactured according to the present invention. An automobile interior member 10 has a substantially L-shaped cross section and includes a sheet laminate 11 consisting of skin 12, a foam layer 14, and a thermoplastic resin film 16, which are laid over a foamed bead base 18.

The skin 12 is 0.2 to 1.5 mm in thickness and is made of polypropylene (PP) with a softening additive. The foam layer 14 is manufactured by foaming polypropylene to expand by ten to thirty times and has a thickness ranging from 1 to 3 mm. The thermoplastic resin film 16 is of 50 to 400 micrometer in thickness, made of ethylene-vinyl acetate copolymer (EVA) and has a glass transition point, or the second transition point, ranging from at 70° to 120° C. The thermoplastic resin film 16 is made of olefin resin and is about 50 to 400 micrometer in thickness; and has a glass transition point ranging from 90° to 190° C.

The foamed bead base 18 has a thickness not less than 5 mm and is made of polypropylene foaming beads, foamed to expand by 7 to 50 times. Both the foam layer 14 and the foamed bead base 18 have a glass transition point ranging from 160° to 200° C. The material of the film 16 is selected such that the film 16 shows an excellent thermal adhesiveness at temperatures below the glass transition point of the foam layer 14 and the foamed bead base 18.

The following Table 1 summarizes the specifications of the respective layers.

TABLE 1

| Element | 12 (12a) | 14 (14a) | 16 *16a) | 18 (18a) |
|---|---|---|---|---|
| Base Material | PP | PP | EVA | Olefin Resin | PP Beads |
| Additive | Softening Agent | Foaming Agent | — | — | Foaming Agent |
| Glass Transition Point | 160–200° C. | 160–200° C. | 70–120° C. | 90–190° C. | 160–200° C. |
| Thickness | 0.2–1.5 mm | 1–3 mm | 50–400 μm | 50–400 μm | >5 mm |
| Expansion Ratio | | 10–30 | | | 7–50 |

A typical method of manufacturing the automobile interior member 10 is described in detail as a first embodiment.

Figure 3:
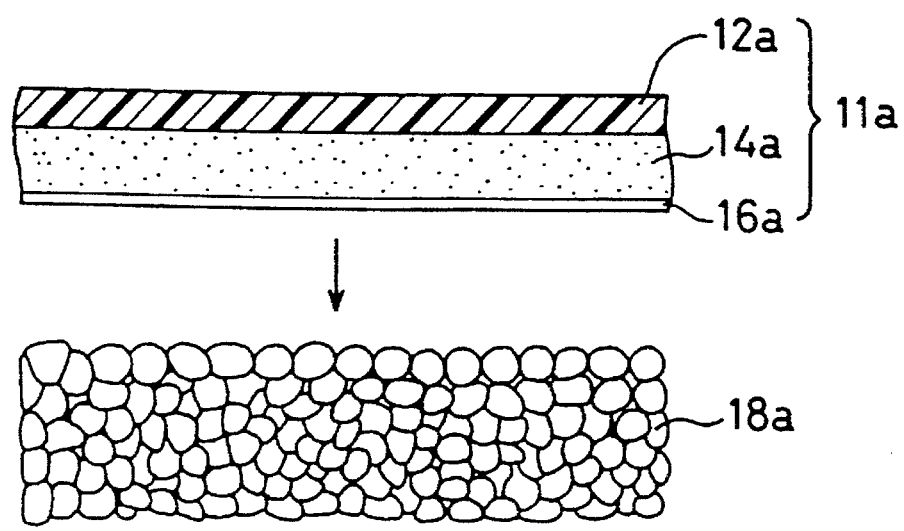
FIG. 3 is an enlarged cross sectional view illustrating a sheet laminate and a forming beads base prior to being adhered together.

FIG. 3 is an enlarged cross sectional view illustrating a sheet laminate and a foaming bead base, prior to being adhered together. In the explanation given below, each constituent of the interior member 10 before or in the course of manufacturing is expressed as the corresponding numeral plus an alphabetical symbol, for example, a sheet laminate 11a or a foamed bead base 18a.

The sheet laminate 11a shown in FIG. 3 is prepared by joining a skin 12a, a foam layer 14a, and a thermoplastic resin film 16a with adhesives or by thermal bonding. The sheet laminate 11a thus prepared is then heated to adhere to the foamed bead base 18a as described below.

Figure 4:
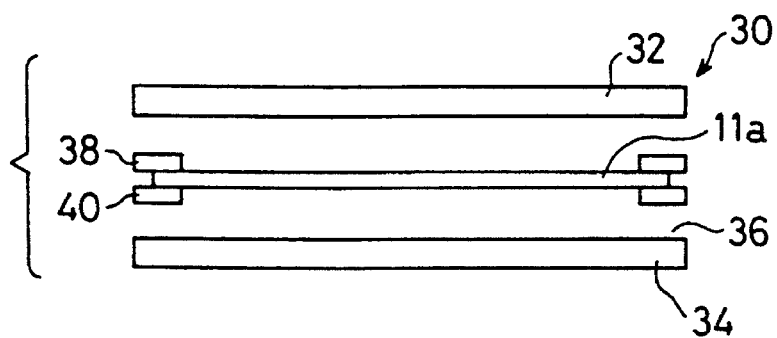
FIG. 4 shows a heating process of the sheet laminate of FIG. 3 in a first embodiment.

As shown in FIG. 4 the sheet laminate 11a is inserted into a heating device 30. The heating device 30 includes an upper heater 32, a lower heater 34, and a heating chamber 36 disposed between the upper and lower heaters 32 and 34. Both ends of the sheet laminate 11a are held by an upper clamp 38 and a lower clamp 40 in the heating chamber 36 and heated to approximately 150° C. on upper and lower surfaces by the upper and lower heaters 32 and 34.

The foamed bead base 18a is prepared, for example, by supplying plurality of resin foaming beads, which are preliminarily expanded in a cavity of a mold having a desired L-shape, and, heating the resin forming beads to be softened by, for example, steam. After cooling, the foamed bead base 18a has a predetermined L-shape.

The foamed bead base 18a is full of gaps of spaces of approximately 1 mm between the beads, as illustrated in FIG. 3. Such gaps allow favorable air ventilation and generally do not require any additional through holes for vacuum forming. The foamed bead base 18a may, however, include one or plurality of through holes at specific portions where an extremely high suction force is required, such as deep drawing portions.

Figure 5:
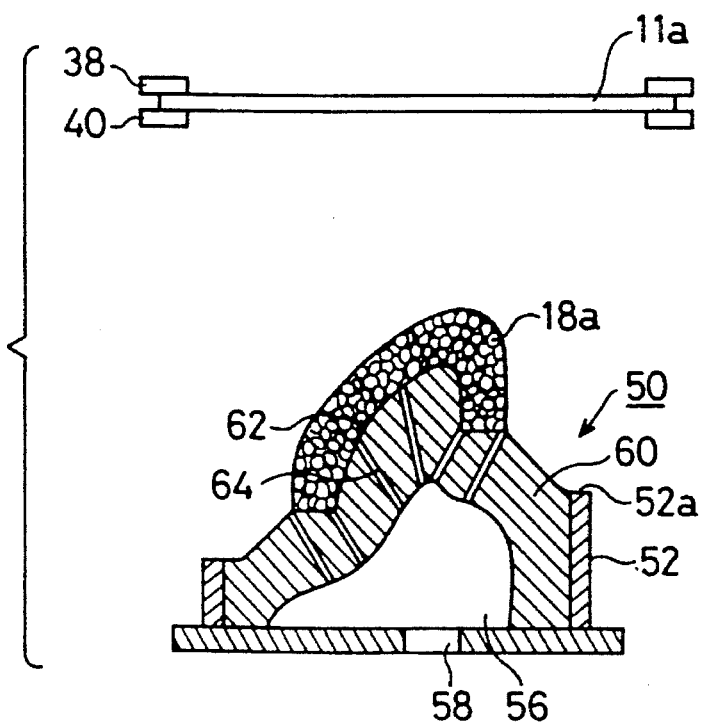
FIG. 5 shows a male vacuum molding device with the foamed bead base arranged thereon in a vacuum forming process of the first embodiment.

The foamed bead base 18a is then mounted on a male vacuum molding device 50 as shown in FIG. 5. The vacuum molding device 50 includes a support base 52, a mold 60 fixed in the support base 52, and a pressure chamber 56 defined by the support base 52 and the mold 60. The pressure chamber 56 is connected to a vacuum pump (not shown) via a through hole 58 formed at the bottom of the support base 52. The mold 60 includes a molding surface 62 and a plurality of suction holes 64 running from the molding surface 62 to the pressure chamber 56.

The pre-heated sheet laminate 11a held between the upper and lower clamps 38 and 40 is, preferably transported to a predetermined position above the mold 60 by a conveyor unit (not shown). The vacuum molding device 50 is then moved upward, thereby laying the laminate 11a over the formed bead base 18a and the mold 60. The laminate 11a covers an upper circumferential portion 52a of the support base 52 accordingly.

The vacuum pump is then operated to start vacuum forming. The air in a space between the sheet laminate 11a and the foamed bead base 18a is drawn out via the suction holes 64 and a plurality of gaps between the beads in the foamed bead base 18a.

Since the thermoplastic resin film 16a in the laminate 18a (FIG. 3) is softened in the above heating process (FIG. 4) it thermally adheres to the upper surface of the foamed bead base 18a. The sheet laminate 11a is therefore securely adhered to the upper surface of the foamed bead base 18a. The joined laminated product is then removed from the mold 60 and from the clamps 38 and 40. The sheet laminate 11a is then cut to a predetermined length and shape so as to form the automobile interior member 10 shown in FIG. 2.

Since the thermoplastic resin film 16a shows an excellent thermal adhesiveness, even at relatively low temperatures which are below the glass transition point of the foam layer 14a and the foamed bead base 18a, the formed beads base 18a and the sheet laminate 11a are securely adhered.

The foam layer 14a is made of a material having a higher glass transition point than that of the thermoplastic resin film 16a, and is not excessively softened or deformed in the heating process.

The method of the first embodiment does not require application of an adhesive as are required by the conventional techniques, thus simplifying manufacturing processes and effectively maintaining the surface of the skin 12 of the interior member 10 free from undesirable irregularities or roughness due to uneven application of the adhesive. Since the irregularities of the foamed bead base 18 are sufficiently smoothed out with the thermoplastic resin film 16, the skin 12 has a smooth surface.

Figure 7:
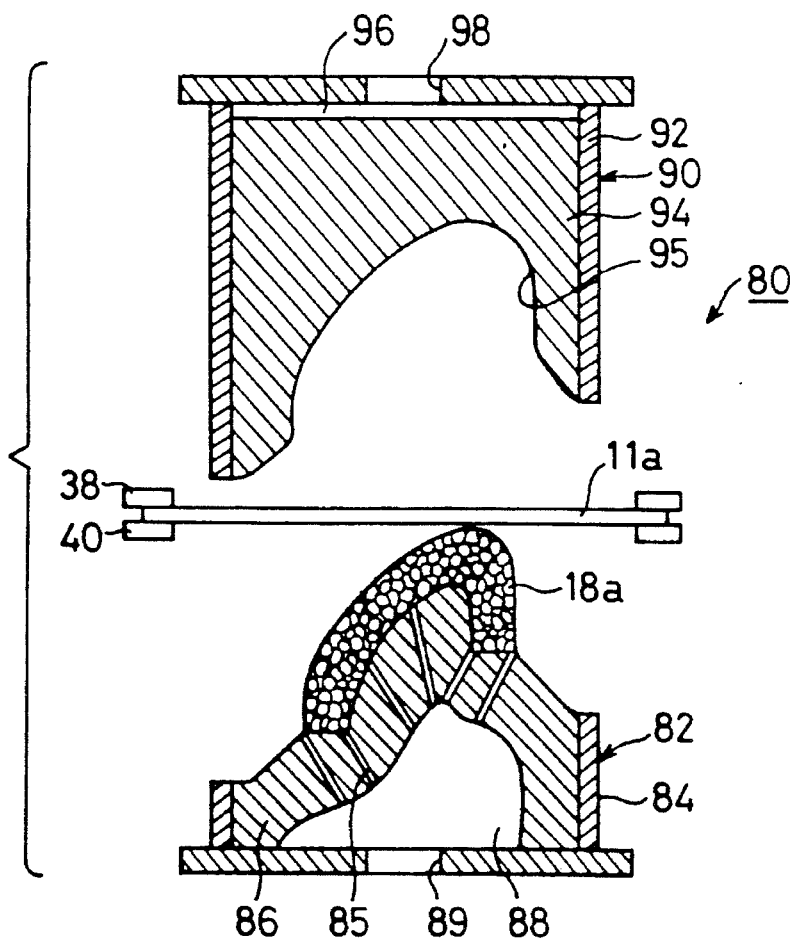
FIG. 7 shows a female vacuum molding device prior to mold closing in a vacuum forming process of a second embodiment.
Figure 8:
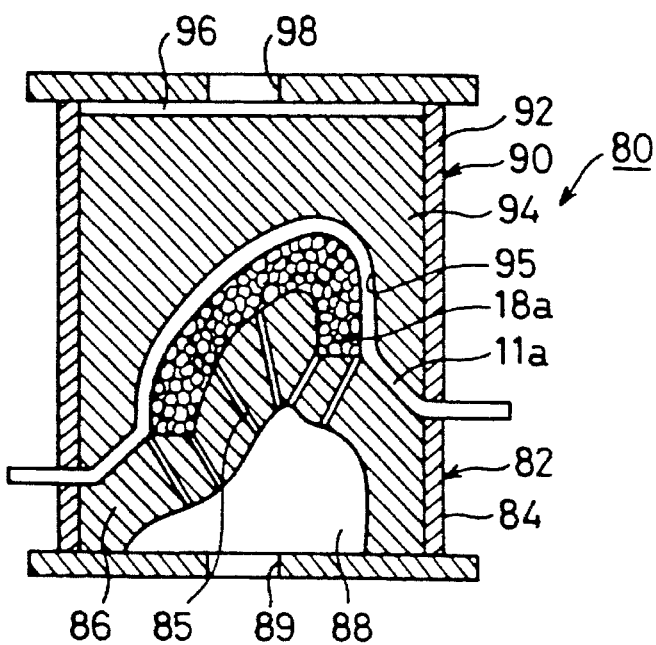
FIG. 8 shows the vacuum molding device of FIG. 7 after completion of the vacuum forming process.

Although the first embodiment described above uses the male vacuum forming process, female vacuum forming with a plug mold may alternatively be used. FIGS. 7 and 8 illustrate another vacuum forming process of a second embodiment using, a female vacuum molding device 80. The vacuum molding device 80 includes a lower molding portion 82 and an upper molding portion 90.

The lower molding portion 82 includes a lower support base 84 and a plug mold 86 having an through holes 85. A lower chamber 88 is defined by the lower support base 84 and the plug mold 86. The lower support has an opening 89 at the bottom.

The upper molding portion 90 includes an upper support base 92 and a female mold 94 which is made of a porous ceramics and has a molding surface 95 with grain patterns. The upper molding portion 90 is moved vertically with respect to the lower molding portion 82 by a driving unit (not shown). A pressure chamber 96 defined by the upper support base 92 and the female mold 94 is connected to a vacuum pump (not shown) via an opening 98 formed at the top plate of the upper support base 92.

In the vacuum forming process, the foamed bead base 18a is mounted on the upper face of the plug mold 86. The pre-heated sheet laminate 11a securely held with the clamps 38 and 40 is transported to a position between the lower molding portion 82 and the upper molding portion 90. The clamps 38 and 40 are then moved down to the level of the upper end of the lower support base 84 of the lower molding portion 82, thereby laying the laminate 11a over the foamed bead base 18a and the plug mold 86.

As clearly seen in FIG. 8, the sheet laminate 11a takes a shape conforming to the upper face of the foamed bead base 18a when the upper molding portion 90 moves down to the lower molding portion 82 to seal the vacuum molding device 80. The air between the sheet laminate 11a and the foamed bead base 18a is discharged through a plurality of gaps between the beads in the foamed bead base 18a, the through hole 85, the lower chamber 88, and the opening 89. In this press forming process, the thermoplastic resin film 16a softened by pre-heating is thermally adhered to the upper face of the foamed bead base 18a.

In the subsequent female vacuum forming process, the air is drawn out via the opening 98 of the upper molding potion 90 with the vacuum pump. The upper face of the sheet laminate 11a is accordingly shaped to conform with the molding surface 95 of the female mold 94, thereby to have the grain patterns. After completion of the vacuum forming, the upper molding portion 90 is moved upward to a position shown in FIG. 7. A laminated product is then taken out of the molding device 80. The sheet laminate 11a is then cut to a predetermined length and shape so as to form the automobile interior member 10 as illustrated in FIG. 2.

According to the this second embodiment, the thermoplastic resin film 16a securely joins the sheet laminate 11a with the foamed bead base 18a as well as efficiently covering the uneven surface of the foamed bead base 18a, thus making the skin 12 of the interior member 10 free from undesirable irregularities or roughness.

Since the thermoplastic resin film 16a is easily but securely adhered to the foamed bead base, 18a by thermal pressing, the thermoplastic resin film 16a is not removed from, or, stripped off, the foamed bead base 18a even when the suction force in the vacuum forming process works to remove the sheet laminate 11a from the foamed bead base 18a.

Figure 9:
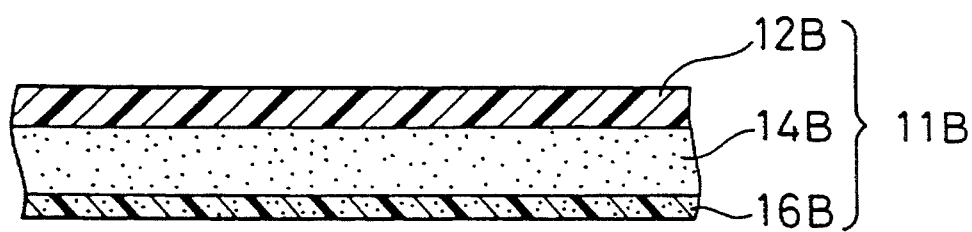
FIG. 9 is a cross sectional view illustrating a modification of the sheet laminate.

The thermoplastic resin film 16a used for joining the sheet laminate 11a with the foamed bead base 18a in the first and second illustrative embodiments may be substituted by a foam sheet. FIG. 9 is a cross sectional view of a sheet laminate 11B including a skin 12B, a foam layer 14B, and a foam sheet 16B.

The foam sheet 16B is made of polypropylene with azodicarbonamide (ADCA) as a foaming agent, with an adjusted a glass transition point in a range of 190° to 210° C. The glass transition point can be adjusted by controlling the duration of polymerizing PP, to thereby adjusting the molecular of weight of the PP, for example. The foam sheet 16B has a thickness ranging from 0.05 to 1.0 mm in the non-foamed state and 0.1 to 3 mm in foamed state respectively. The expansion ratio is preferably in a range of 1.5 to 10. The melting point of the foam sheet 16B is preferably 20° to 60° C. lower than that of the foam layer 14B such that the foam sheet 16 shows a sufficient adhesive strength and that deformation of the foam layer 14B is prevented. The foam sheet 16B including a foaming agent may be formed to a laminate in non-foamed state and then foamed in the heating process. The other layers 12B and 14B are the same as in the laminate 11a shown in FIG. 3. The following table 2 summarizes the specifications of the respective layers.

TABLE 2

| Element | 12B | 14B | 16B | 18 (18a) |
| --- | --- | --- | --- | --- |
| Base Material | PP | PP | PP | PP Beads |
| Additive | Softening | Foaming | ADCA | Foaming |

TABLE 2-continued

| Element | 12B | 14B | 16B | 18 (18a) |
|---|---|---|---|---|
| Glass Transition Point | Agent 160–200° C. | Agent 160–200° C. | 190–210° C. | Agent 160–200° C. |
| Thickness | 0.2–1.5 mm | 1–3 mm | 0.05–1.0 mm (BEFORE EXPANSION) 0.1–3.0 mm (AFTER EXPANSION) | >5 mm |
| Expansion Ratio | | 10–30 | | 7–50 |

The foam sheet 16B securely adheres to the upper face of the foamed bead base 18a (FIG. 6) in a similar manner as the thermoplastic resin film 16a of the first embodiment. Furthermore, softened and partly melted foam sheet 16B effectively compensates for the irregularities or roughness of the foamed bead base 18a (FIG. 6) and makes the surface of the skin 12B smooth.

Since the foam sheet 16B is formed to a desirable shape in the vacuum forming process and then thermally adhered to the foamed bead base 18a, the foam sheet 16B securely and completely adheres to the foamed bead base 18a.

The first and second embodiment described above may be altered, changed, and modified in various ways. Some examples of such modification are given below.

Material of each constituent of the resin laminate is not limited to the above embodiments, but, for example, polyvinyl chloride (PVC) or another materials may also be used as well as polypropylene (PP). For example, the foam layer 14a may be made of PVC, and the foamed bead base 18a may be made of PP. In such a case, since PVC and PP are not easily bonded to each other, a thermoplastic resin film laminate including a first film adhering to PVC and a second film adhering to PP is applied in place of the thermoplastic resin film 16a. The first film of the film laminate is, for example, made of a thermoplastic elastomer resin having a polar group. The polarity of the first film and the second film joins the two films together.

As detailed above, the thermoplastic resin film 16a is adhered to the foam layer 14a and the skin 12a to form a laminate prior to vacuum forming in the first and second embodiments. Alternatively, the thermoplastic resin film 16a may be prepared separately from the skin 12a and the foam layer 14a, and placed between the foam layer 14a and the foamed bead base 18a in the vacuum forming process. The thermoplastic resin film 16a can be softened with residual heat of the skin 12a and foam layer 14a which are previously heated to be formed easily. This simplifies and increases the energy efficiency of the manufacturing process.

Figure 6:
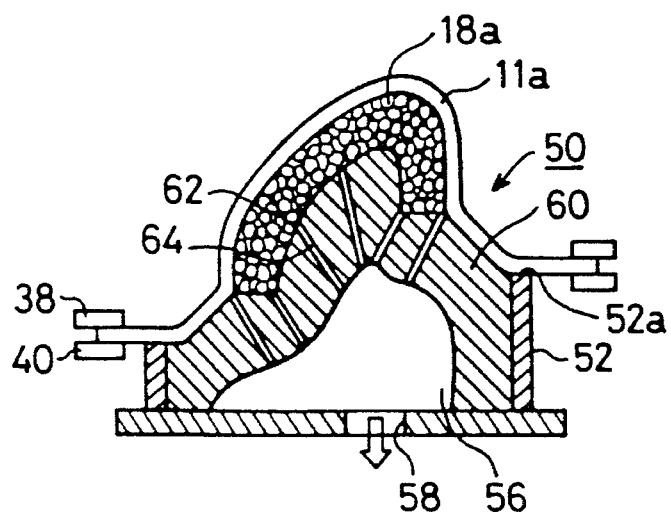
FIG. 6 shows the vacuum molding device of FIG. 5 after completion of the vacuum forming process.

Compressed air may be blown onto the upper face of the sheet laminate 11a to efficiently press the sheet laminate 11a against the foamed bead base 18a in the male vacuum forming process shown in FIG. 6. This compressed air-pressing further enhances the thermal adhesion between the sheet laminate 11a and the foamed bead base 18a.

Although the male vacuum forming or the female vacuum forming process is applied in the first or second embodiment described above, other forming or molding methods such as press forming may also be applicable as long as the sheet laminate 11a is securely adhered to the foamed bead base 18a.

Figure 10:
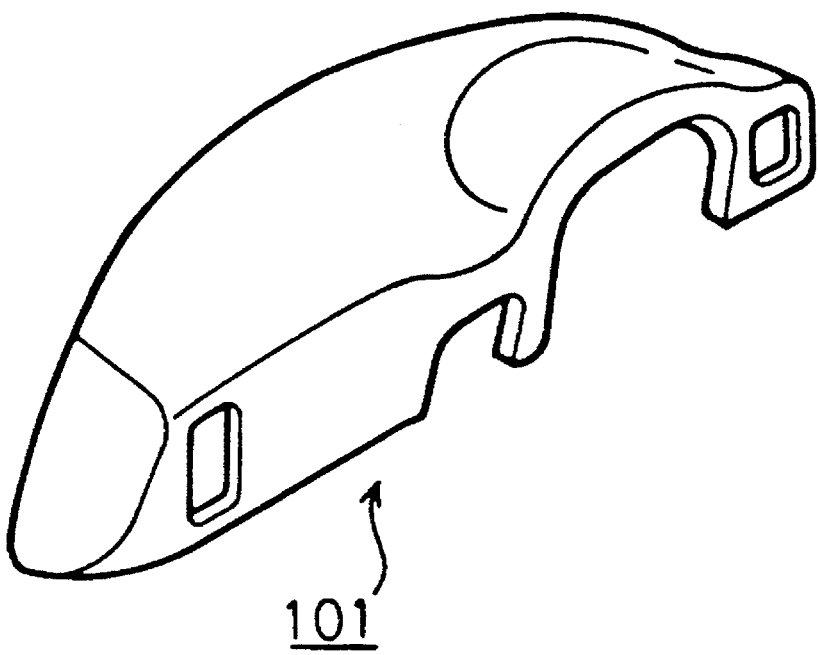
FIG. 10 is a perspective view illustrating an instrument panel embodiment according to the invention.
Figure 11:
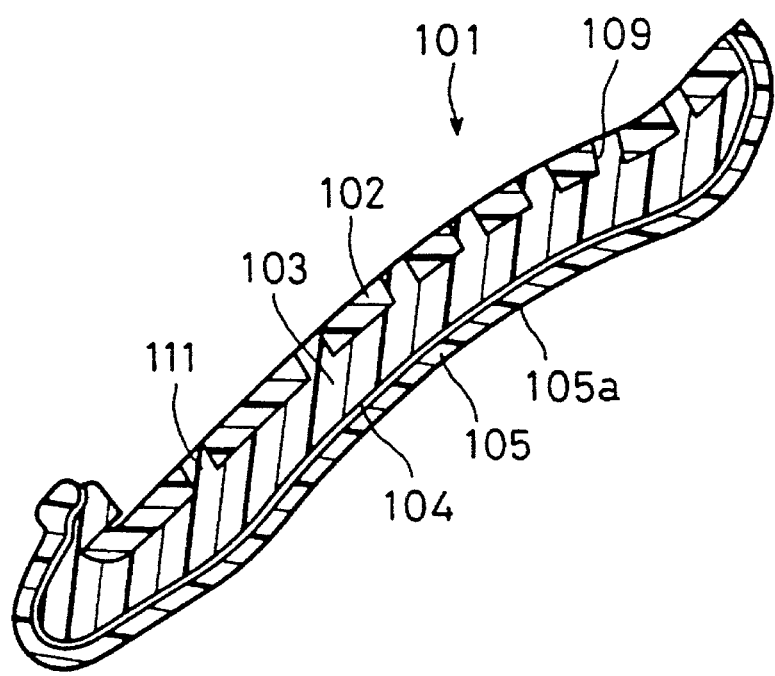
FIG. 11 is a cross sectional view showing the instrument panel of FIG. 10.

FIG. 10 is a perspective view illustrating an instrument panel 101 of an automobile as another embodiment of the invention. FIG. 11 is a cross sectional view of a part of the panel 101. In FIG. 11 the dimensions are not drawn to scale.

The instrument panel 101 includes a base 102 to be fixed to an automobile body (not shown); a foam layer 103 formed by expanding resin foaming beads; a thermoplastic film 104; and a skin 105 having an ornamental face 105a, for example, a grained pattern.

The thickness of base 102 is 1.0 to 5.0 mm and is made of hard plastic with fillers. The base 102 has a plurality of through holes 109 and material-supplying apertures 111.

The foam layer 103 has a thickness of preferably between 5 to 30 mm which is expanded by heating resin foaming beads with, for example, steam. The skin 105, which has a thickness ranging from 0.20 to 1.5 mm, is made of thermoplastic resin. The thermally adhesive resin film 104, which has a thickness ranging from 0.04 to 1.0 mm, is made of thermoplastic resin applicable.

In this embodiment, the base 102, the foam layer 103, the resin film 104, and the skin 105 are all made of olefin resin or polypropylene (PP). The base 102 has a glass transition point of 160° to 170° C., the foam layer 103, 140° to 160° C., the resin film 104, 140° to 155° C., and the skin 105, 160° to 170° C. The glass transition point of the thermally adhesive resin film 104 is preferably, 5° to 30° C. lower than that of the skin 105; for example, polypropylene for the film 104 has a lower molecular weight than that for the skin 104.

The following Table 3 summarizes the specifications of the respective layers.

TABLE 3

| Element | 102 | 103 | 104 | 105 |
|---|---|---|---|---|
| Base Material | PP | PP | PP | PP |
| Additive | Filler Agent (Glass fiber) | Foaming Agent | — | — |
| Glass Transition Point | 160–170° C. | 140–160° C. | 140–155° C. | 160–170° C. |
| Thickness | 1.0–5.0 mm | 5–30 mm | 0.04–1.0 mm | 0.2–1.5 mm |

The constituents of the instrument panel 101, that is, the base 102, the foam layer 103, the thermally adhesive resin film 104, and the skin 105 are subjected to heating, vacuum forming, and foaming processes as described below.

Figure 12:
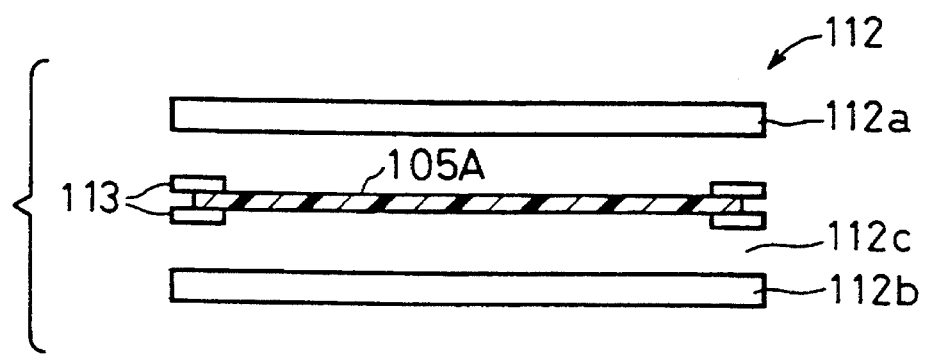
FIG. 12 shows a process of heating a skin sheet of the instrument panel of FIG. 11.

FIG. 12 is a conceptual view showing a heating device applicable in the present invention. The heating device 12 includes an upper heater 112a, a lower heater 112b, and a heating chamber 112c disposed between the upper and lower heaters 112a and 112b. In the heating process, a skin sheet A, the precursor of the skin 105, is held on its ends with a pair of clamps 113, inserted in the heating chamber 112c, and heated to approximately 160 on upper and lower surfaces by the upper and lower heaters 112a and 112b.

Figure 13:
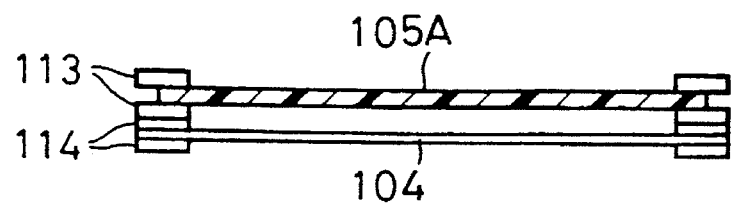
FIG. 13 illustrates a process of pre-heating a thermally adhesive resin film with the skin sheet.

Then, as shown in FIG. 13, the thermally adhesive resin film 104 held with a pair of clamps 114 is placed with a predetermined space apart from the skin sheet 105A. The predetermined space is provided to prevent the skin sheet 105A contacting the thermally adhesive resin film 104 when heated. Radiant heat of the skin sheet 105A softens the thermally adhesive resin film 104. The pre-heated sheet 105a and the resin film 104 are subjected to a vacuum forming process.

Figure 14:
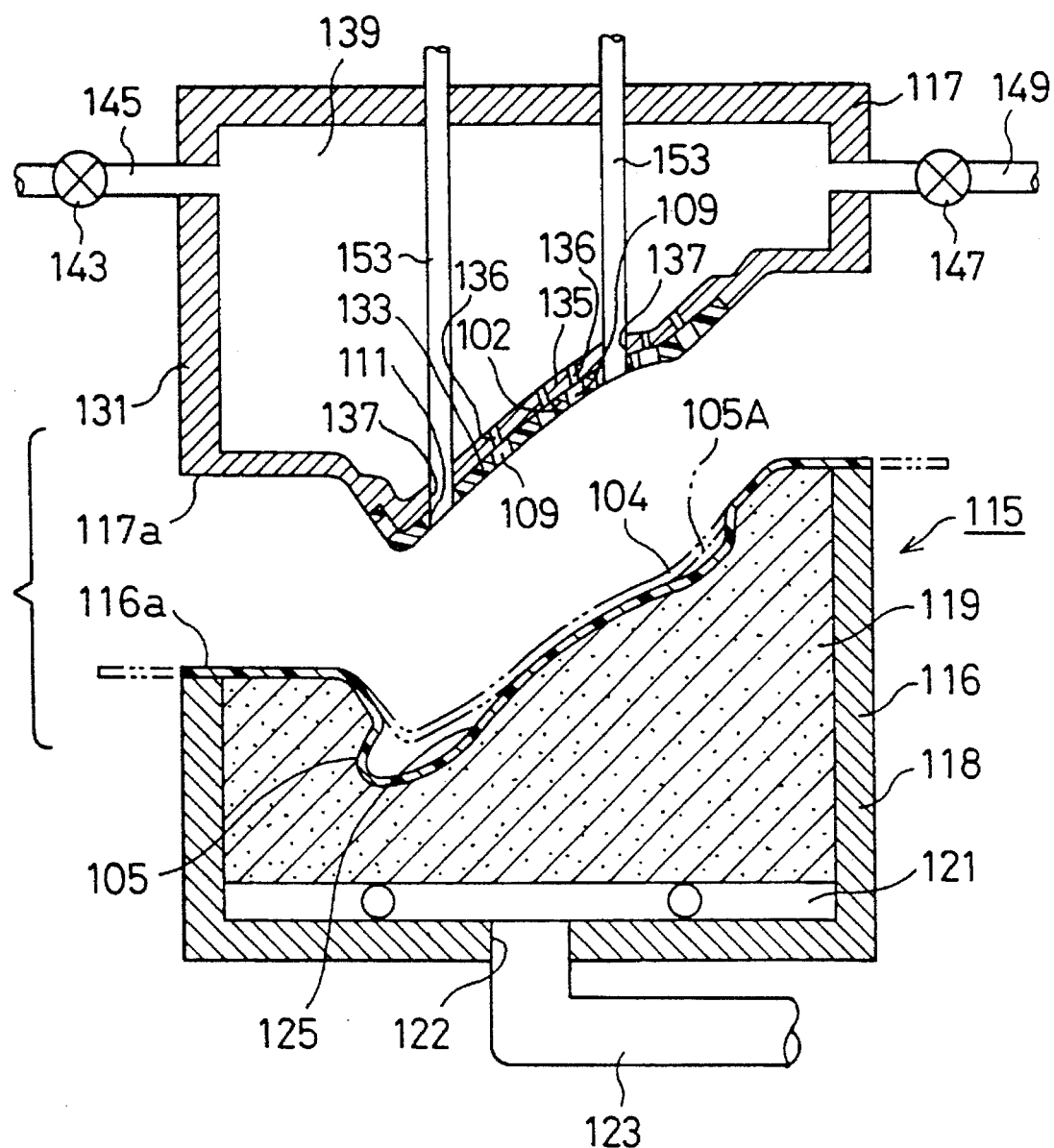
FIG. 14 is a cross sectional view showing an internal state of a molding device prior to the mold closing step according to the method of the present invention.

FIG. 14 is a cross sectional view of a molding device 115 used in the vacuum forming and thermally expanding process. The molding device 115 has a lower molding portion 116 and an upper molding portion 117. The lower molding portion 116 includes a frame 118, a lower mold 119 fitted in the frame 118 and a pressure chamber 121 defined by the frame 118 and the lower face of the lower mold 119. The pressure chamber 121 is connected to a duct 123 via an air vent 122 formed in the center of the bottom of the frame 118, and further connected to a vacuum pump (not shown) through the duct 123.

The lower mold 119 has a molding surface 125 with ornamental patterns to form an ornamental face 105A on the skin 105. The lower mold 119 is made of a porous material which is prepared by sintering a mixture of metal powder and ceramic powder. The porous body of the lower mold 119 transmits air between the pressure chamber 121 and the molding surface 125. After being placed on the molding surface 125, the skin 105 is drawn onto the molding surface 125 by suction of the vacuum pump. The upper molding portion 117 includes a frame 131 and an upper mold 135 fitted in the frame 131. The upper mold 135 has a support face 133 and a plurality through holes 136 and material-supplying apertures 137.

A space surrounded and defined by the frame 131 and the upper mold 135 is a steam chambers 139. The steam chamber 139 is connected with a first conduit 145 with a first valve 143, and a second conduit 149. The upper molding portion 117 also includes plural pipes 153 for supplying resin foaming beads M. The pre-heated sheet 105A and the thermally adhesive resin film 104 shown inn FIG. 13 are turned over and mounted on the lower mold 119.

The sheet 105A and the thermally adhesive resin film 104 are drawn onto the surface 125 of the lower mold 119 by suction of the vacuum pump via the porous lower mold 119, thereby forming the skin 105 having the surface pattern of the molding surface 125. The thermally adhesive resin film is attached on the sheet 105A in this process.

Figure 15:
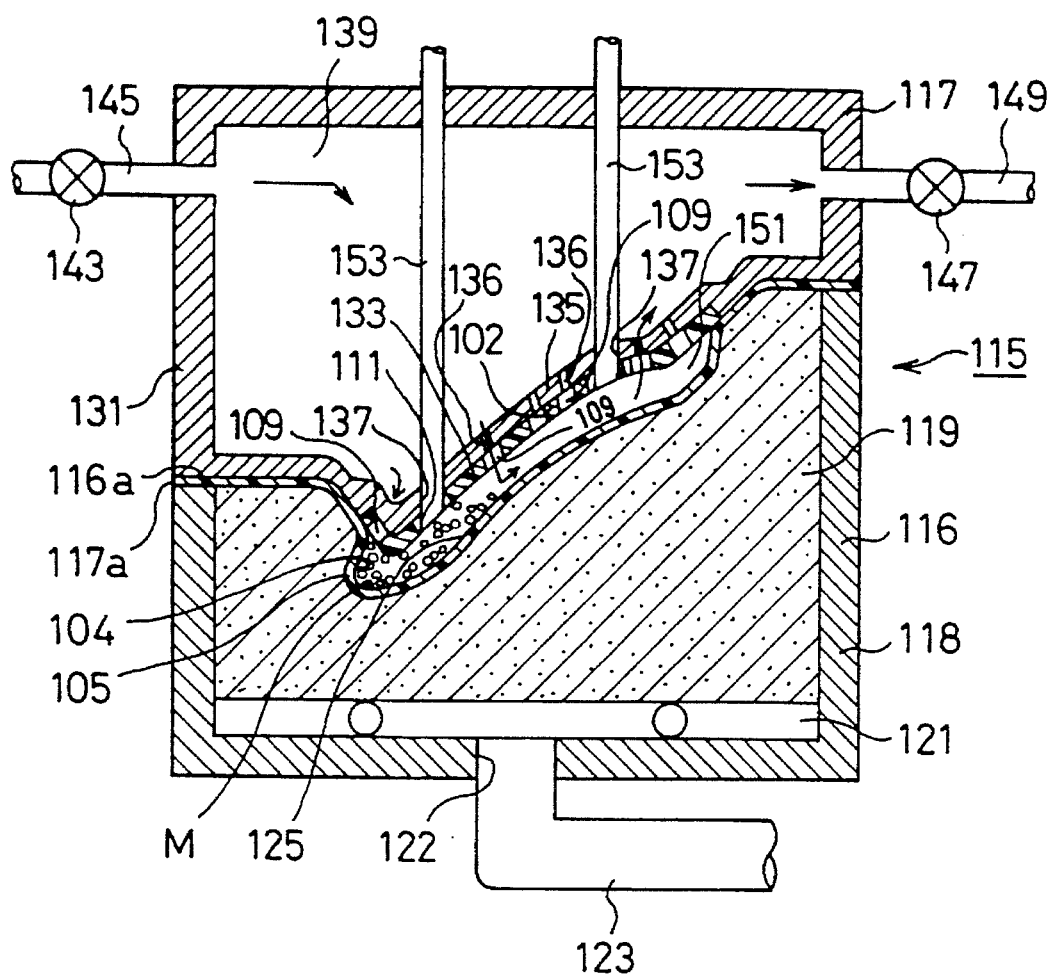
FIG. 15 is a cross sectional view showing a state of supplying resin foaming beads prior to the expanding step according to the method of the present invention.

The base 102 (FIG. 11), which is previously manufactured to have a predetermined shape, is temporarily fixed to the upper mold 135 of the upper molding portion 117. The upper molding portion 117 is then moved down and pressed against the lower molding portion 116 as shown in FIG. 15. Consequently, the base 102 is attached to the upper molding portion 117 and the periphery of the skin 105 is fixed between contact faces 116a and 117a of the lower and the upper molding portions 116a and 117a of the lower and the upper molding portions 116 and 117. At this time, a predetermined vacant space 151 of about 15 mm in depth is formed between the base 102 and the skin 105. This predetermined vacant space 151 is attributed to a recess of the molding surface 125 of the lower mold 119.

The plurality of through holes 109, and the plurality of material-supplying apertures 111 of the base 102 respectively coincide with the through holes 136 and the material-supplying apertures 137 of the upper mold 135 when the base 102 is fixed to the upper mold 135. The resin foaming beads M are supplied from a material supply unit (not shown) through the plural pipes 153 and the apertures 111 of the base 102 into the vacant space 151. The resin foaming beads M are made of polypropylene including a foaming agent and they are expanded by 11 to 45 times to have the mean diameter of about 3 mm. The resin foaming beads M provide softness to the instrument panel 101. The resin foaming beads M are formed to 11 to 45 times. The amount of the resin foaming beads M is determined to fill the space 151 after expansion.

After supplying the resin foaming beads M, steam is introduced into the steam chamber 139 through the first conduit 45. The steam introduced in the steam chamber 139 flows through the through holes 136 of the upper mold 135, the through holes 109 of the base 102 into the space 151 to heat the resin foaming beads M. The steam in the space 151 then flows back through the through holes 109, the through holes 136 to the steam chamber 139 and is discharged through the second conduit 149. The resin forming beads M are heated and expanded to form the foam layer 103 between the film 104 and base 102. The foam layer 103 is consequently thermally bonded to the film 104 and the base 102.

After the resin laminate is cooled, the upper molding portion 117 is lifted from the lower molding portion 116, and the product is removed from the mold.

Since the glass transition point of the thermally adhesive resin film 104 is lower than the skin 105, the film 104 is melted at a lower temperature than that of the skin 105 and securely adheres the skin 105 and the foam layer 103. The foam layer 103 and the base 102, both of which are made of the same olefin resin, are therefore fixed to one another to form the laminated instrument panel 101.

The thermally adhesive resin film 104 is sufficiently melted by steam to securely join the foam layer 103 and the skin 105, and effectively covers any existing roughness of the foam layer 103. The irregularities of the foam layer 103 therefore do not affect the surface of the skin 105 even if the skin 105 is soft and thin, thus maintaining an excellent surface for application of ornamental designs. Further, the use of the thin skin helps to reduce the cost.

Since the material on the skin 105 is not required to have a glass transition point comparable to the expanding temperature of the resin foaming beads M, it can be selected from a variety of materials such as higher molecular weight olefin resin.

Since the, through holes 109 are arranged regularly over the base 102, the resin foaming beads M uniformly fill the space 151. The foam layer 103, which is made by expanding the resin foaming beads M, therefore securely adheres to the base 102 and the skin 105 by the application of heat, for example, steam.

The thickness of the instrument panel 101 can easily be controlled by widening or narrowing the vacant space 151 between the base 102 and the skin 105. For example, a thin instrument panel 101 is manufactured when resin foaming beads with a small expansion ratio are formed in a narrow space 151.

Since the above embodiment does not use any adhesive to join the base 102, the foam layer 103, and the skin 105, unevenness of the skin 105 is not introduced due to non-uniform application of adhesive as in conventional processes.

Since the three layers of the instrument panel 101, that is, the skin 105, the film 104, the foam layer 103, and the base 102 are made of the same olefin resin, they are readily recycled.

Figure 17:
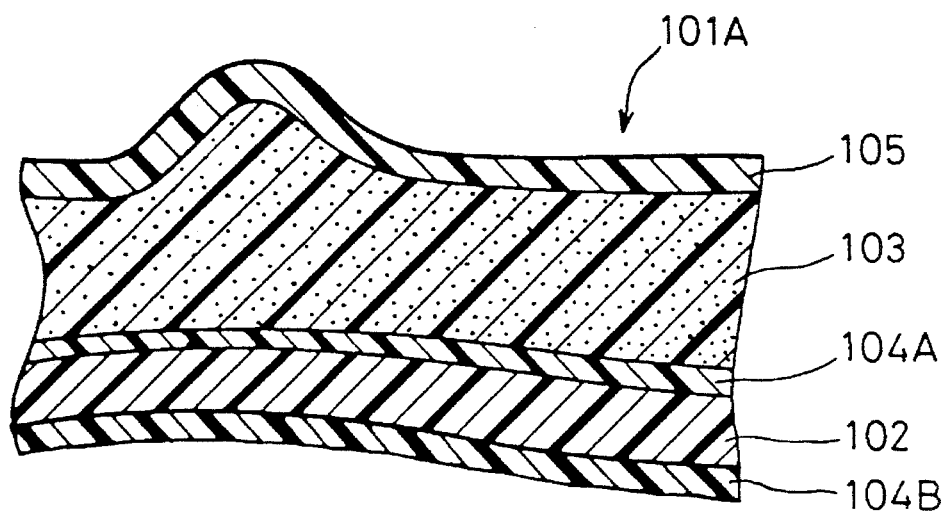
FIG. 17 is a cross sectional view illustrating a modification of the instrument panel according to the present invention.
Figure 16:
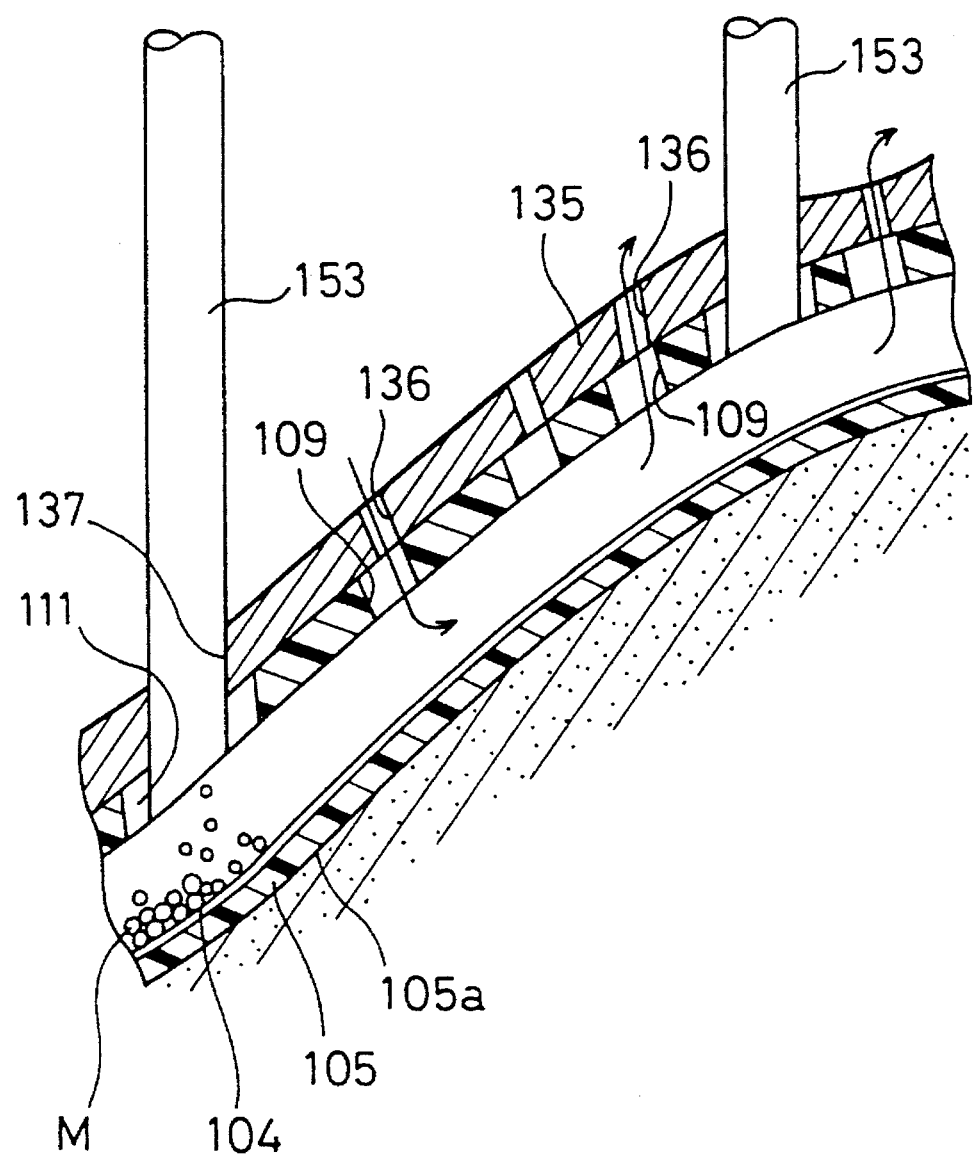
FIG. 16 is an enlarged cross sectional view showing a primary part of the molding device of FIG. 15.

FIG. 17 is a cross sectional view showing another instrument panel 101A manufactured according to the method of the invention. The instrument panel 101A includes a first layer of thermally adhesive resin 104A a base 102, a second layer of thermally adhesive resin 104B, a foam layer 103, and a skin 105.

The instrument panel 101A is manufactured in the following process. The base 102 and the thermally adhesive resin layers 104A and 104B are first formed integrally by a so-called sandwich molding. The thermally adhesive resin layers 104B are made of a resin having a glass transition point lower than that of the base 102.

In the sandwich molding, after a first resin material is injected into a mold to form a thermally adhesive resin layers, another resin material is injected from a nozzle into the thermally adhesive resin layer, to form the base 102. The thermally adhesive resin layer is divided into the first and the second layers 104A and 104B, respectively. The base 102 with those thermally adhesive resin layers 104A and 104B is mounted on the lower surface of the upper molding portion 117 (FIG. 14) in the vacuum forming process.

In this modification, the base 102 can be made of a material having a glass transition point higher than the expanding temperature of the resin forming beads M. This improves the strength of the base 102 and thereby that of the instrument panel 101A. The base 102 is securely held between the thermally adhesive resin layers 104A and 104B and is firmly adhered to the foam layer 103 by the thermally adhesive resin layer 104B.

The invention can be embodied in other forms without departing from the scope of spirit of essential characteristics thereof. Some examples of modification are given below.

The base 102 made of polypropylene in the above embodiment can be made of other solid olefin resins, such as, polyethylene. The foam layer 103 made from foaming beads of polypropylene in the above embodiment can be made from beads of other olefin resins, such as, polyethylene. The preferable diameter of the resin foaming beads ranges from 1 to 5 mm, and more specifically from 2.0 to 4 mm.

Figure 18:
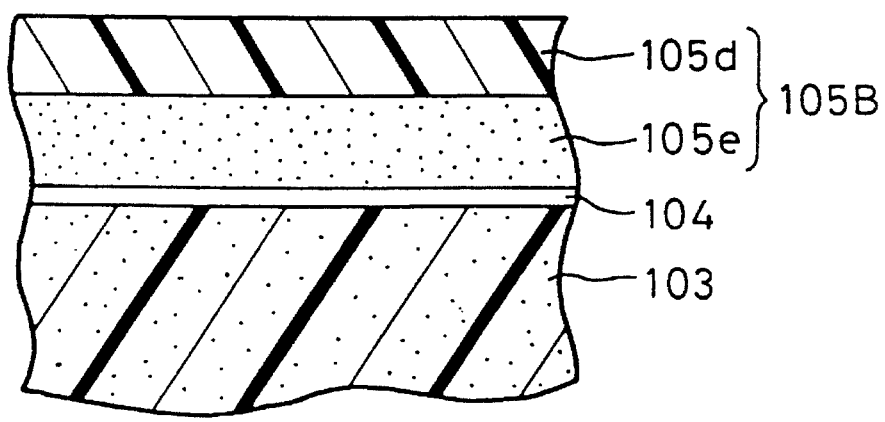
FIG. 18 is a cross sectional view illustrating another modification of the instrument panel according to the present invention.

The resin layer laid over the foam layer 103 can be made of any desirable material which sufficiently adheres to the foam layer 103. For example, as shown in FIG. 18, a thermally adhesive resin film 104 and a skin 105B including a hard skin layer 105d and a foam layer 105e are joined with the foam layer 103 to form a laminate. The resin layer may wholly or partly be embedded or inserted in the foam layer 103 according to specific requirements. The thermally adhesive resin film 104 can be formed separately and bonded to the skin in a pre-heating process, or alternatively, formed integrally with the skin by extrusion molding.

The skin 105 made of polypropylene in the above embodiment may be made of another resin such as polyethylene or SEBS (block co-polymer of styrene—ethylene—butylene styrene).

The resin laminate of the invention is applicable to various interior parts of vehicles other than the instrument panel.

Although the supply of resin foaming beads follows placement of the skin and the base in the mold in the embodiment described above. The resin foaming beads may be piled up on either the skin or the base placed in a mold and then be covered with a base or a skin, respectively.

It is clearly understood that the above embodiment is only illustrative and not restrictive in any sense, and the spirit and scope of the present invention are not limited by the foregoing examples.

What is claimed is:

1. A method comprising the steps of:
   (1) opening a mold having opposing mold portions and placing a first resin layer therein on one mold portion, the first resin layer having a first melting temperature;
   (2) placing a second resin layer over at least a portion of the first resin layer, the second resin layer having a second melting point lower than the first melting point;
   (3) placing a third resin material on another mold portion;
   (4) closing the mold to form a cavity therein bounded by the third resin material along at least a portion of one side of the cavity and by the first and second resin materials on at least a portion of another side of the cavity;
   (5) introducing foam beads into the cavity;
   (6) heating the mold at least to the first melting temperature thereby expanding the foam beads into a foamed bead base to thermally adhere the first, second and third layers together with the foamed bead base.

2. A method in accordance with claim 1, wherein said second resin layer is made of an olefin resin with a glass transition point 5 through 60 degrees centigrade lower than those of said first resin layer and said foamed bead base.

3. A method in accordance with claim 1, including the step of thermally adhering said first resin layer to said second resin layer.

4. A method in accordance with claim 1, wherein said first resin layer and said second resin layer are formed from first and second resin materials, respectively, and the method includes an initial step of forming a laminate of said first resin layer and said second resin layer by simultaneously extruding said first resin material and said second resin material.

5. A method in accordance with claim 1, wherein step 6 further comprises the step of:
   drawing said first resin layer and said second resin layer onto a face of said foamed bead base placed on a vacuum forming device by suction, to thereby conform said first resin layer and said second resin layer to said face of said foamed bead base.

6. The method as in claim 1 wherein said third resin material includes a plurality of through holes and the step of expanding the foam beads includes the additional step of expanding the foam bead base into the plurality of through holes.

7. The method as in claim 1 where heating is accomplished by supplying steam into the cavity.

8. A method of manufacturing a resin laminate, comprising the steps of:
   (a) preparing a resin member comprised of a first resin material and resin foaming beads comprised of said first resin material, and providing a thermoplastic resin sheet of a second resin material which is in a group meltable to said first resin material, said thermoplastic resin sheet having a glass transition point lower than that of said resin member;
   (b) placing said resin member and said thermoplastic resin sheet in a mold while maintaining a predetermined space facing said thermoplastic resin sheet;
   (c) supplying said resin foaming beads into said space; and
   (d) heating said resin foaming beads to form a foam layer, said foam layer being thermally adhered to said resin member via said thermoplastic resin sheet through melting and re-solidifying of said thermoplastic resin sheet member due to said heating.

9. A method in accordance with claim 8, wherein said step (a) further comprises a step of preparing said thermoplastic resin sheet to have a glass transition point 5 through 60 degrees centigrade lower than the glass transition point of said resin member and said foam layer.

10. A method in accordance with claim 9, wherein step (b) further includes a step of placing a solid resin base opposite to said thermoplastic resin sheet across said space.

11. A method in accordance with claim 10, wherein said step (b) includes the step of:

drawing said resin member onto a molding face of the mold by suction, to thereby conforming the shape said resin member to said molding face.

* * * * *